(12) United States Patent
Zähe

(10) Patent No.: US 11,384,857 B1
(45) Date of Patent: Jul. 12, 2022

(54) BIDIRECTIONAL PRESSURE RELIEF VALVE

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 0 days.

(21) Appl. No.: 17/366,450

(22) Filed: Jul. 2, 2021

(51) Int. Cl.
*F16K 17/196* (2006.01)

(52) U.S. Cl.
CPC ....... *F16K 17/196* (2013.01); *Y10T 137/7772* (2015.04); *Y10T 137/7777* (2015.04); *Y10T 137/7778* (2015.04)

(58) Field of Classification Search
CPC ............. F16K 17/196; Y10T 137/7772; Y10T 137/7777; Y10T 137/7778
USPC ................................. 137/493.1, 493.7, 493.8
See application file for complete search history.

(56) References Cited

U.S. PATENT DOCUMENTS

| | | | | |
|---|---|---|---|---|
| 2,730,124 A * | 1/1956 | Buchanan | ............. | F15B 11/162 137/493.1 |
| 2,758,811 A * | 8/1956 | Peterson | ............... | F16K 31/363 251/38 |
| 3,054,420 A * | 9/1962 | Williams | ............ | F16K 17/0433 137/514.3 |
| 3,856,041 A * | 12/1974 | Cryder | .................... | F16K 17/26 137/512.2 |
| 4,217,927 A * | 8/1980 | Morita | ................... | F16K 17/196 137/493.3 |
| 4,270,567 A * | 6/1981 | Tsukimoto | .............. | F16K 39/04 137/493.5 |
| 4,742,846 A * | 5/1988 | DiBartolo | ............. | F16K 17/065 137/469 |
| 4,834,135 A * | 5/1989 | DiBartolo | ............. | F16K 17/065 251/282 |
| 5,381,823 A * | 1/1995 | DiBartolo | ............. | F16K 17/065 137/494 |
| 6,640,830 B2 * | 11/2003 | Zahe | ..................... | G05D 16/106 137/494 |
| 7,467,642 B2 * | 12/2008 | Prinsen | ............... | F16K 17/0433 137/492.5 |

(Continued)

OTHER PUBLICATIONS

"Relief, Bi-Directional," CR10-28, High Performance Hydraulic Cartridge Valves and Manifold Systems Catalogue Sheet, dated 1999.

*Primary Examiner* — William M McCalister
(74) *Attorney, Agent, or Firm* — McDonnell Boehnen Hulbert & Berghoff LLP

(57) ABSTRACT

An example valve includes a seat element; an outer piston configured to be seated against the seat element at when the valve is in a closed position to block fluid flow from a first port of the valve to a second port of the valve; an inner piston disposed partially within the outer piston and configured to be seated against the outer piston when the valve is in the closed position to block fluid flow from the second port to the first port; and a setting spring applying a biasing force on the inner piston in a distal direction. The valve can operate in: (i) a first mode of operation wherein fluid is received at the first port and relieved to the second port, and (ii) a second mode of operation, wherein fluid is received at the second port and relieved to the first port.

18 Claims, 5 Drawing Sheets

(56) References Cited

U.S. PATENT DOCUMENTS 9,850,919 B2 * 12/2017 Zaehe .................. F15B 13/029
2005/0028869 A1 * 2/2005 Roth .................... F16K 17/196
137/493.4

* cited by examiner

500

502 — OPERATING A VALVE IN A CLOSED POSITION, WHEREIN THE VALVE COMPRISES (I) A SEAT ELEMENT, (II) AN OUTER PISTON, (III) AN INNER PISTON DISPOSED PARTIALLY WITHIN THE OUTER PISTON, AND (IV) A SETTING SPRING APPLYING A BIASING FORCE ON THE INNER PISTON IN A DISTAL DIRECTION, WHEREIN OPERATING THE VALVE IN THE CLOSED POSITION COMPRISES CAUSING THE OUTER PISTON TO BE SEATED AGAINST THE SEAT ELEMENT TO BLOCK FLUID FLOW FROM A FIRST PORT OF THE VALVE TO A SECOND PORT OF THE VALVE, AND CAUSING THE INNER PISTON TO BE SEATED AGAINST THE OUTER PISTON TO BLOCK FLUID FLOW FROM THE SECOND PORT TO THE FIRST PORT

504 — OPERATING THE VALVE IN A FIRST MODE OF OPERATION, WHEREIN FLUID RECEIVED AT THE FIRST PORT APPLIES A NET FLUID FORCE ON THE OUTER PISTON AND THE INNER PISTON THAT OVERCOMES THE BIASING FORCE, CAUSING THE OUTER PISTON TO BE UNSEATED FROM THE SEAT ELEMENT AND MOVE WITH THE INNER PISTON IN A PROXIMAL DIRECTION, THEREBY ALLOWING FLUID FLOW FROM THE FIRST PORT TO THE SECOND PORT

506 — OPERATING THE VALVE IN A SECOND MODE OF OPERATION, WHEREIN FLUID RECEIVED AT THE SECOND PORT PUSHES THE OUTER PISTON IN THE DISTAL DIRECTION AGAINST THE SEAT ELEMENT WHILE APPLYING A RESPECTIVE NET FLUID FORCE ON THE INNER PISTON THAT OVERCOMES THE BIASING FORCE, CAUSING THE INNER PISTON TO BE UNSEATED FROM THE OUTER PISTON AND MOVE IN THE PROXIMAL DIRECTION, SUCH THAT A FLOW AREA IS FORMED BETWEEN THE OUTER PISTON AND THE INNER PISTON TO ALLOW FLUID FLOW FROM THE SECOND PORT TO THE FIRST PORT THROUGH THE FLOW AREA

FIG. 5

BIDIRECTIONAL PRESSURE RELIEF VALVE

BACKGROUND

A relief valve or pressure relief valve (PRV) is a type of safety valve used to control or limit the pressure in a system. Pressure might otherwise build up and can cause equipment failure. The pressure is relieved by allowing the pressurized fluid to flow out of the system to a tank or low pressure fluid reservoir. In some applications, a PRV can be used to build pressure level of fluid up to a particular pressure level to operate a hydraulic system or component.

A PRV is designed or set to open at a predetermined setting pressure to protect other components and other equipment from being subjected to pressures that exceed their design limits. When the setting pressure is exceeded, the PRV becomes or forms the "path of least resistance" as the PRV is forced open and a portion of fluid is diverted to the tank. As the fluid is diverted, the pressure inside the system stops rising. Once the pressure is reduced and reaches the PRV's setting pressure, the PRV closes.

A PRV typically has a first port where fluid is received and a second port connected to a fluid reservoir. When pressurized fluid at the first port exceeds the setting pressure, the valve opens and fluid is relieved from the first port to the second port. In some applications, the second port might not be connected to a reservoir and may under some operating conditions receive pressurized fluid. It may thus be desirable to have the PRV configured to be bidirectional so as to relieve pressure from the first port to the second port and from the second port to the first port.

Further, the PRV may have a movable element such as a spool or poppet. As fluid flows around the poppet, fluid may cause Bernoulli flow forces to oppose the actuation force applied to the poppet, and as a consequence, the valve might not operate as expected. It may thus be desirable to configure the valve in a manner that reduces flow forces.

It is with respect to these and other considerations that the disclosure made herein is presented.

SUMMARY

The present disclosure describes implementations that relate to a bidirectional pressure relief valve.

In a first example implementation, the present disclosure describes a valve. The valve includes: a seat element; an outer piston configured to be seated against the seat element at when the valve is in a closed position to block fluid flow from a first port of the valve to a second port of the valve; an inner piston disposed partially within the outer piston and configured to be seated against the outer piston when the valve is in the closed position to block fluid flow from the second port to the first port; and a setting spring applying a biasing force on the inner piston in a distal direction. The valve operates in: (i) a first mode of operation, wherein fluid received at the first port applies a net fluid force on the outer piston and the inner piston that overcomes the biasing force, causing the outer piston to be unseated from the seat element and move with the inner piston in a proximal direction, thereby allowing fluid flow from the first port to the second port, and (ii) a second mode of operation, wherein fluid received at the second port pushes the outer piston in the distal direction against the seat element while applying a respective net fluid force on the inner piston that overcomes the biasing force, causing the inner piston to be unseated from the outer piston and move in the proximal direction, such that a flow area is formed between the outer piston and the inner piston to allow fluid flow from the second port to the first port through the flow area.

In a second example implementation, the present disclosure describes a method. The method includes: operating a valve in a closed position, wherein the valve comprises (i) a seat element, (ii) an outer piston, (iii) an inner piston disposed partially within the outer piston, and (iv) a setting spring applying a biasing force on the inner piston in a distal direction, wherein operating the valve in the closed position comprises causing the outer piston to be seated against the seat element to block fluid flow from a first port of the valve to a second port of the valve, and causing the inner piston to be seated against the outer piston to block fluid flow from the second port to the first port; operating the valve in a first mode of operation, wherein fluid received at the first port applies a net fluid force on the outer piston and the inner piston that overcomes the biasing force, causing the outer piston to be unseated from the seat element and move with the inner piston in a proximal direction, thereby allowing fluid flow from the first port to the second port; and operating the valve in a second mode of operation, wherein fluid received at the second port pushes the outer piston in the distal direction against the seat element while applying a respective net fluid force on the inner piston that overcomes the biasing force, causing the inner piston to be unseated from the outer piston and move in the proximal direction, such that a flow area is formed between the outer piston and the inner piston to allow fluid flow from the second port to the first port through the flow area.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 5 is a flowchart of a method for operating a valve, in accordance with an example implementation.

DETAILED DESCRIPTION

Pressure relief valves are configured to open at a preset pressure and discharge fluid until pressure drops to acceptable levels in a system. In operation, the pressure relief valve can remain normally-closed until pressure upstream reaches a desired setting pressure. The valve can then "crack" open when the setting pressure is reached to allow fluid flow from a first port to a second port, and continue to open further, allowing more flow as pressure increases. When upstream pressure falls below the setting pressure, the valve closes again.

In some examples, it may be desirable to configure the relief valve as a bidirectional relief valve. Whether pressurized fluid is received at the first port or the second port, once the pressure level reaches the setting pressure, the valve opens to allow fluid flow therethrough.

It may also be desirable to configure the relief valve with geometric features that reduce the effect of flow forces on performance of the valve. Particularly, flow forces resulting from accelerating fluid mass through a flow area formed within the valve may cause the valve to allow a reduced amount of flow for a given pressure drop across the valve than expected. Alleviating the effect of flow forces may be desirable as the valve may perform as expected.

Disclosed herein is a relief valve with a split piston. The split piston comprises an outer piston and an inner piston. When the valve is closed, the outer pistons is seated against a seat element to block fluid flow. In a first mode of operation, the two pistons can move together when pressurized fluid at a first port of the valve exceeds a setting pressure of the valve, thereby allowing fluid flow from a first port to a second port. In a second mode of operation, the pistons separate and move relative to each other, to allow fluid flow therebetween from the second port to the first port. The outer piston and the seat element can be configured with geometric features that reduce flow forces that act on the outer piston in a closing direction.

Figure 1:
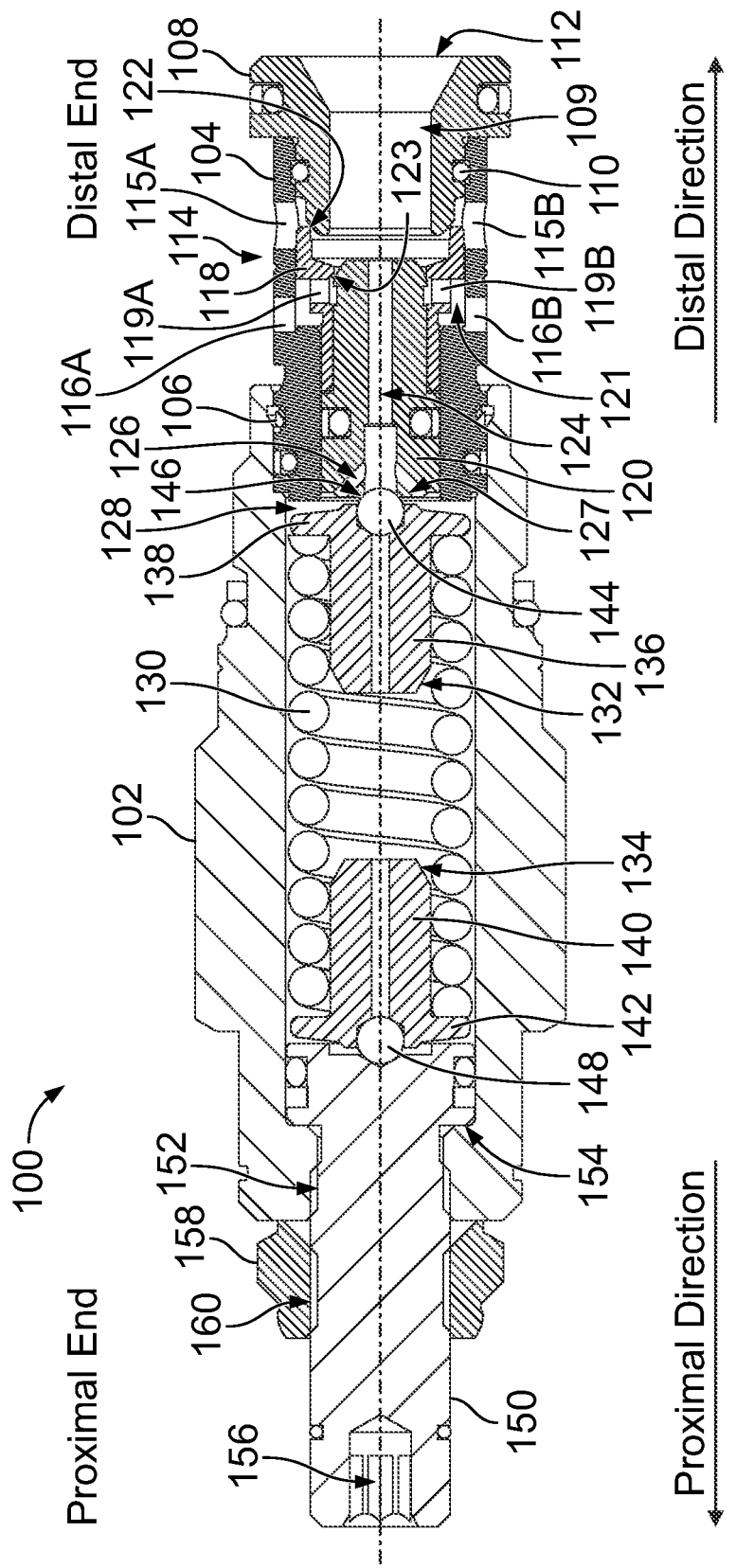
FIG. 1 illustrates a cross-sectional side view of a valve in a closed position, in accordance with an example implementation.

FIG. 1 illustrates a cross-sectional side view of a valve 100 in a closed position, in accordance with an example implementation. The valve 100 may be inserted or screwed into a manifold having ports corresponding to ports of the valve 100 described below, and can thus fluidly coupled the valve 100 to other components of a hydraulic system.

The valve 100 includes a housing 102 that includes a longitudinal cylindrical cavity therein. The valve 100 also includes a sleeve 104 received at a distal end of the housing 102, and the sleeve 104 is coaxial with the housing 102. The sleeve 104 can be retained to the housing 102 via a retention ring 106 disposed in an annular space formed by an exterior annular groove formed in the sleeve 104 and a corresponding interior annular groove formed in the housing 102.

The width of the grooves in which the retention ring 106 is disposed may be made larger than a diameter or width of the retention ring 106. With this configuration, the sleeve 104 is "floating" relative to the housing 102 and is allowed to have some axial "play" during operation of the valve 100. In conventional valves, a sleeve is typically swaged-in, or screwed via threaded engagement into, and might not be configured to have such axial "play." Such configuration of conventional valve is more expensive due to the cost associated with swaging or machining threads.

The valve 100 further includes a nose piece that can be referred to as a seat element 108 as it operates as a seat for a piston as described below. The seat element 108 is a generally cylindrical component that is hollow, and forms a main chamber 109 therein.

The seat element 108 can be retained to the sleeve 104 via a retention O-ring 110 disposed in an annular space formed by an exterior annular groove formed in the seat element 108 and a corresponding interior annular groove formed in the sleeve 104.

The width of the grooves in which the retention O-ring 110 is disposed may be made larger than a diameter or width of the retention O-ring 110. With this configuration, the seat element 108 is "floating" and is allowed to have some axial "play" during operation of the valve 100. Particularly, the valve 100 can be inserted into a cavity of a manifold, and the manifold can have an interior surface that supports or interfaces with the seat element 108. A gap may exist between the interior surface of the manifold and the seat element 108. Due to the seat element 108 being capable of floating, it can traverse such gap under some operating conditions. In conventional valves, a nose piece or seat element is typically swaged-in, or screwed via threaded engagement into, the sleeve and is not configured to have such axial "play." In other conventional valves a threaded nut is used to retain the nose piece within the sleeve and the nut threadedly engages the sleeve rather than the nose piece. Such configurations of conventional valves are more expensive due to the cost associated with swaging or machining threads in both the nose piece or nut and the sleeve. Also, in such convention valves, a seal is added between the nose piece and the sleeve to seal any clearance therebetween. Further, any misalignment between the nose piece and the sleeve due to manufacturing tolerances can result in leakage, rendering the valve inoperable.

The configuration of the valve 100 may alleviate such issues. In contrast with conventional valves, the seat element 108 is floating within the sleeve 104 and is allowed to move axially within a cavity of the manifold relative to the sleeve 104 to compensate for any misalignment. This configuration further eliminates threads and uses the retention O-ring 110 disposed about the exterior peripheral surface of the seat element 108 to retain the seat element 108 to the sleeve 104 and also preclude leakage between the seat element 108 and the manifold.

The valve 100 includes a first port 112 and a second port 114. The first port 112 is defined at a nose or distal end of the seat element 108 and the sleeve 104, whereas the second port 114 is disposed laterally with respect to (i.e., on the side of) the sleeve 104. The second port 114 can include a first set of cross-holes such as outlet cross-holes 115A, 115B, disposed in a circumferential array about an exterior surface of the sleeve 104. The second port 114 can also include a second set of cross-holes such as inlet cross-holes 116A, 116B disposed in a circumferential array about the exterior surface of the sleeve 104. As depicted in FIG. 1, the inlet cross-holes 116A, 116B are axially-spaced from the outlet cross-holes 115A, 115B along a length of the sleeve 104. The term "hole" is used generally herein to indicate a hollow place (e.g., cavity) in a solid body or surface, for example. The term "cross-hole" indicates a hole that crosses a path of, or is formed transverse relative to, another hole, cavity, or channel.

As described in detail below, when the valve 100 operates in a first mode of operation in which fluid is allowed to flow from the first port 112 to the second port 114, fluid flows from the first port 112 and through the main chamber 109, then through the outlet cross-holes 115A, 115B to the second port 114. On the other hand, when the valve 100 operates in a second mode of operation in which fluid is allowed to flow from the second port 114 to the first port 112, fluid flows from the second port 114 through the inlet cross-holes 116A, 116B to the main chamber 109, then to the first port 112.

The sleeve 104 includes a respective longitudinal cylindrical cavity therein, and the valve 100 includes a split piston including an outer piston 118 and an inner piston 120 that are axially-movable within the longitudinal cylindrical cavity of the sleeve 104. The term "piston" is used herein to encompass any type of movable element, such as a spool-type movable element or a poppet-type movable element.

The outer piston 118 is disposed, and slidably accommodated, in the longitudinal cylindrical cavity of the sleeve 104 between the exterior surface of the inner piston 120 and the interior surface of the sleeve 104. The inner piston 120 is also disposed partially within the outer piston 118 and is slidably accommodated in the longitudinal cylindrical cavity of the sleeve 104, i.e., the inner piston 120 can slide along the interior surfaces of the outer piston 118 and the sleeve 104.

Further, the term "slidably accommodated" is used herein to indicate that a first component (e.g., the outer piston 118 or the inner piston 120) is positioned relative to a second component (e.g., the sleeve 104) with sufficient clearance therebetween, enabling movement of the first component relative to the second component in the proximal and distal directions. As such, the first component (e.g., outer piston 118 and the inner piston 120) is not stationary, locked, or fixedly disposed in the valve 100, but rather, is allowed to move relative to the second component (e.g., the sleeve 104).

The outer piston 118 has piston cross-holes 119A, 119B disposed in a circumferential array about an exterior surface of the outer piston 118. Further, an annular chamber 121 is formed between the exterior surface of the outer piston 118 and the interior surface of the sleeve 104. The annular chamber 121 fluidly couples the piston cross-holes 119A, 119B to the inlet cross-holes 116A, 116B of the second port 114.

As shown in FIG. 1, in the closed position, where the valve 100 blocks fluid flow between the first port 112 and the second port 114, the outer piston 118 is seated against the seat element 108 at a first seat 122 to block fluid flow from the first port 112 to the outlet cross-holes 115A, 115B. Similarly, in the closed position, the outer piston 118 is seated against the inner piston 120 (or the inner piston 120 is seated against the outer piston 118) at a second seat 123 to block fluid flow from the second port 114 through the inlet cross-holes 116A, 116B and the piston cross-holes 119A, 119B to first port 112. The term "block" is used throughout herein to indicate substantially preventing fluid flow except for minimal or leakage flow of drops per minute, for example.

The inner piston 120 has a plurality of channels or holes including a longitudinal channel 124 and a plurality of cross-holes or slanted channels such as slanted channel 126 and slanted channel 127. The longitudinal channel 124 communicates fluid flow from main chamber 109, which receives fluid from the first port 112, therethrough and then to the slanted channels 126, 127. The slanted channels 126, 127 then communicate the fluid to a spring chamber 128 formed within the housing 102.

The valve 100 includes a setting spring 130 disposed within the spring chamber 128. The setting spring 130 is disposed or retained between a first spring cap that can be referred to as a distal spring cap 132 and a second spring cap that can be referred to as a proximal spring cap 134. The spring caps 132, 134 can also be referred to as spring guides or spring retainers.

The distal spring cap 132 has a cylindrical portion 136 that operates as a guide for the setting spring 130, which is disposed partially about the exterior surface of the cylindrical portion 136. The distal spring cap 132 also has radial protrusions 138 against which the distal end of the setting spring 130 rests.

In the example implementation shown in FIG. 1, the proximal spring cap 134 is configured similar to the distal spring cap 132. In this example, the proximal spring cap 134 has a respective cylindrical portion 140 about the exterior surface of which the setting spring 130 is partially disposed, and has respective radial protrusions 142 against which the proximal end of the setting spring 130 rests. In other example, implementations, however, the spring caps can be configured differently.

In the example implementation of FIG. 1, the distal spring cap 132 has a cavity in which a blocking or checking element such as a ball 144 is disposed. The ball 144 is seated at a ball seat 146 formed in the inner piston 120 at the proximal end of the longitudinal channel 124. With this configuration, the setting spring 130 is configured to apply a biasing force on the inner piston 120 via the distal spring cap 132 and the ball 144.

Similarly, the distal spring cap 134 has a cavity in which a ball 148 is disposed. The valve 100 can further include a spring preload adjustment pin 150 (e.g., a movable piston) interfacing with the ball 148 of the proximal spring cap 134. The spring preload adjustment pin 150 is threadedly coupled to the housing 102 at threads 152. The threads 152 are configured such that as the spring preload adjustment pin 150 rotates, it moves axially to compress or decompress the setting spring 130 via the proximal spring cap 134.

For example, the threads 152 can be configured such that if the spring preload adjustment pin 150 rotates in a counter-clockwise direction, the spring preload adjustment pin 150 moves in the proximal direction, thereby relaxing or decompressing the setting spring 130. The spring preload adjustment pin 150 can move in the proximal direction until it reaches a shoulder 154 formed in the housing 102, which operates as a stop for the spring preload adjustment pin 150. In this example, if the spring preload adjustment pin 150 rotates in a clockwise direction, the spring preload adjustment pin 150 moves in the distal direction, thereby compressing the setting spring 130 via the proximal spring cap 134.

With this configuration, the spring preload adjustment pin 150 operates as a set screw where a tool can be inserted into a cavity 156 at the head of the spring preload adjustment pin 150 to rotate it and adjust the length of the setting spring 130. Adjusting the length of the setting spring 130 changes the biasing force (e.g., changes the preload of the setting spring 130) that the setting spring 130 applies on the distal spring cap 132, which is in turn applied to the inner piston 120, in the distal direction. When the setting spring 130 is compressed (i.e., the spring preload adjustment pin 150 moves in the distal direction), the biasing force of the setting spring 130 increases. On the other hand, when the setting spring 130 is decompressed (i.e., the spring preload adjustment pin 150 moves in the proximal direction), the biasing force of the setting spring 130 decreases.

The valve 100 can further include a lock nut 158 that engages the spring preload adjustment pin 150 via threads 160. Once the spring preload adjustment pin 150 is rotated to a desired position at which the setting spring 130 applies a desired force on the inner piston 120, the lock nut 158 can be used to secure the orientation (i.e., the rotational position) of the spring preload adjustment pin 150 and the resulting position of the proximal spring cap 134, and thus the length and biasing force of the setting spring 130.

The biasing force of the setting spring 130 determines the pressure relief setting of the valve 100. The pressure relief setting is the pressure level of fluid at the first port 112 at which the valve 100 can open to relieve fluid to the second port 114 (or the pressure level of fluid at the second port 114 at which the valve 100 can open to relieve fluid to the first port 112). Specifically, based on a spring rate of the setting spring 130 and the length of the setting spring 130, the setting spring 130 exerts a particular biasing force on the inner piston 120 in the distal direction via the ball 144 seated at the ball seat 146, and the pressure relief setting is based on the particular biasing force of the setting spring 130. As an example for illustration, the pressure relief setting of the valve 100 can be about 5000 psi.

The valve 100 is configured to operate in at least two modes of operation. In a first mode of operation, pressurized fluid is received at the first port 112, whereas the second port 114 is fluidly coupled to a low pressure reservoir. In this mode of operation, the valve 100 operates as a pressure relief valve that relieves fluid from the first port 112 to the second port 114 when pressure level of fluid at the first port 112 exceeds the setting pressure determined by the setting spring 130. In this mode of operation, the outer piston 118 and the inner piston 120 operate as one component (i.e., as a single piston) moving together.

Figure 2:
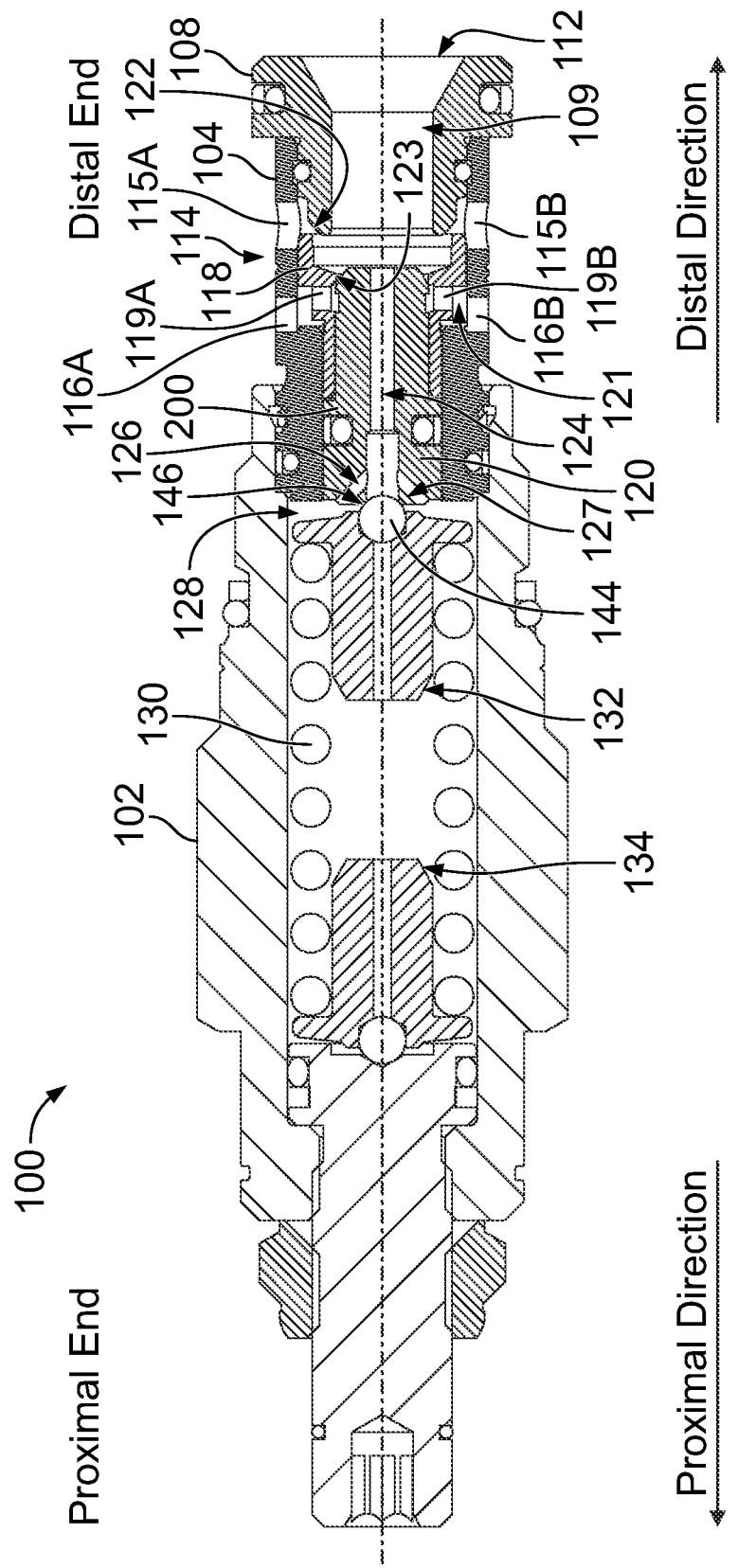
FIG. 2 illustrates a cross-sectional side view of the valve of FIG. 1 100 operating in a first mode of operation as a relief valve relieving fluid from a first port to a second port, in accordance with an example implementation.

FIG. 2 illustrates a cross-sectional side view of the valve 100 operating in a first mode of operation as a relief valve from the first port 112 to the second port 114, in accordance with an example implementation. Pressurized fluid at the first port 112 having a pressure level $P_1$ applies a first fluid force $F_1$ on the outer piston 118 in the proximal direction. This first fluid force is also transmitted to the inner piston 120 due to the proximal end of the outer piston 118 interfacing with or contacting the inner piston 120 via a shoulder 200 formed as a protrusion in the inner piston 120.

Further, pressurized fluid received at the first port 112 flows through the slanted channels 126, 127 to the spring chamber 128. Fluid in the spring chamber 128 has substantially the same pressure $P_1$ communicated from the first port 112. Thus, fluid in the spring chamber 128 applies a second fluid force $F_2$ on the inner piston 120 in the distal direction. The second fluid force is also transmitted to the outer piston 118 via interaction between the shoulder 200 of the inner piston 120 with the outer piston 118. Thus, a net fluid force $F_{Net}=F_1-F_2$ is applied to the combined pistons (i.e., the outer piston 118 and the inner piston 120).

The effective area of the first seat 122 of the outer piston 118 on the seat element 108 can be calculated as a circular area $A_1$ having a diameter $D_1$ of the first seat 122. Thus, $$A_1 = \pi \frac{D_1^2}{4}.$$

Assuming the inner diameter of the sleeve 104 is $D_2$, a second circular area can be calculated as $$A_2 = \pi \frac{D_2^2}{4}.$$

The net fluid force can be estimated as follows:

$$F_{Net} = F_1 - F_2 = P_1(A_1 - A_2) = P_1\left(\pi\frac{D_1^2}{4} - \pi\frac{D_2^2}{4}\right).$$

The net fluid force $F_{Net}$ acts on the combined pistons (i.e., the outer piston 118 and the inner piston 120 as one piston) in the proximal direction against the biasing force of the setting spring 130.

As mentioned above, the setting spring 130 applies a biasing force on the combined pistons (i.e., acts on the inner piston 120 via the ball 144, and the biasing force is then transmitted to the outer piston 118). As long as the pressurized level $P_1$ of fluid at the first port 112 and the main chamber 109 is less than the predetermined setting pressure determined by the setting spring 130, the outer piston 118 remains seated at the first seat 122, with the inner piston 120 contacting it at the shoulder 200.

The combined pistons can move to a new equilibrium position once the pressurized level $P_1$ exceeds the predetermined setting pressure determined by the setting spring 130. Particularly, once the pressure level in the main chamber 109 exceeds the predetermined setting pressure, fluid in the main chamber 109 pushes the outer piston 118 (and the inner piston 120 interacting therewith) in the proximal direction (to the left in FIG. 2) off the first seat 122. As a result, a flow area is formed between the outer piston 118 and the seat element 108.

Figure 3:
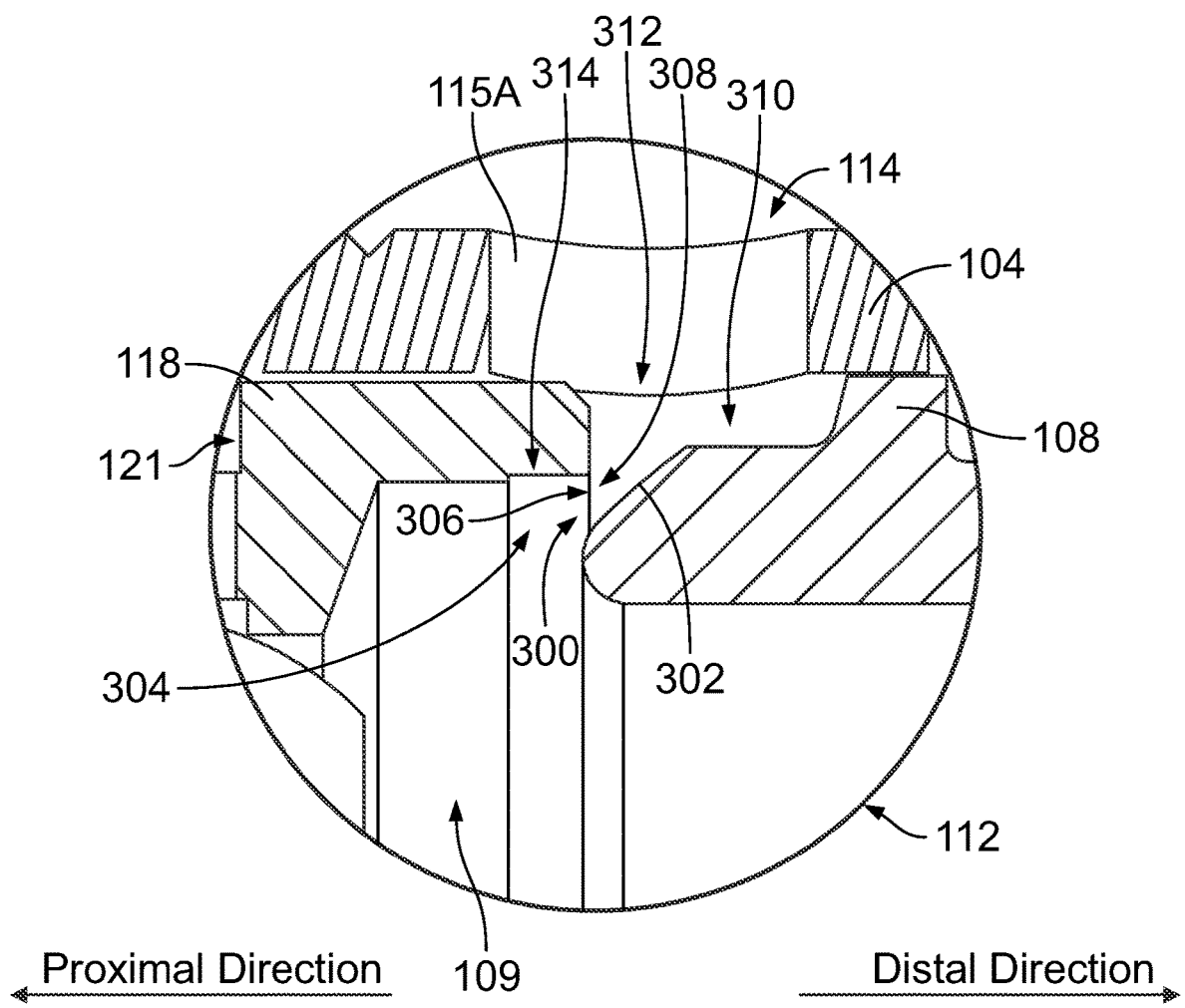
FIG. 3 illustrates a partial cross-sectional side view of the valve of FIG. 1 showing an enlarged view of a flow area formed between an outer piston and a seat element, in accordance with an example implementation.

FIG. 3 illustrates a partial cross-sectional side view of the valve of FIG. 1 showing an enlarged view of a flow area 300 formed between the outer piston 118 and the seat element 108, in accordance with an example implementation. As depicted, the outer piston 118 is unseated from the seat element 108, and the flow area 300 is formed.

The flow area 300 is conical or tapering due to the geometry of the seat element 108. Particularly, the seat element 108 has an inclined surface 302 that causes the flow area 300 to be tapered or conical in shape.

Fluid from the first port 112 flows through the main chamber 109, then through the flow area 300, through the outlet cross-holes 115A, 115B to the second port 114. The flow area 300 includes several flow zones with differing pressure levels and velocities.

For example, a first or inlet flow zone 304, which can be considered an inlet flow area portion of the flow area 300, may have fluid having pressure level of fluid at the first port 112 and the main chamber 109 (e.g., fluid having full pressure level of 5000 psi). Fluid then flows through an intermediate flow zone 306 where the flow area is more restricted due to the conical shape of the flow area 300. In intermediate flow zone 306, pressure level is decreased (e.g., to 2500 psi) and velocity of fluid increases.

Fluid then flows through a restricted flow zone 308, which can be considered the "vena contracta," where the size of the flow area 300 is smallest or most restricted, and fluid velocity is at its maximum. Fluid then flows through an annular chamber 310 formed between the exterior surface of the seat element 108 and the interior surface of the sleeve 104. From the annular chamber 310, fluid flows through a flow restriction 312 formed between a distal end of the outer piston 118 and distal edges of the outlet cross-holes 115A, 115B, then flows through the outlet cross-holes 115A, 115B to the second port 114.

A pressure drop (i.e., a decrease in pressure level of fluid) occurs as fluid flows from the annular chamber 310 through the flow restriction 312. Assuming that the second port 114 is fluidly coupled to a fluid reservoir having atmospheric pressure or fluid having a pressure level of zero psi, the flow restriction 312 causes pressure level in the annular chamber 310 to be slightly higher than zero (e.g., 100 psi).

With this configuration and geometry, a substantial pressure gradient develops in a small region, i.e., between the inlet flow zone 304 and the annular chamber 310. For example, pressure level can drop from 5000 psi to 100 psi in such a small flow region.

This configuration may offer several advantages. Due to the conical shape of the flow area 300, the pressure level at the restricted flow zone 308 can be much smaller than the inlet pressure level the inlet flow zone 304. As an example for illustration, pressure level in the restricted flow zone 308 can be similar to pressure level in the annular chamber 310 (e.g., 100 psi) rather than 5000 psi at the inlet flow zone 304.

Fluid in the restricted flow zone 308 may participate most to the Bernoulli flow forces that act on the outer piston 118 in the distal direction (i.e., in a closing direction) due to acceleration of fluid through the restricted flow zone 308. As such, fluid that might participate most in causing the flow forces has a low pressure level, and thus the resulting flow forces are reduced and might not substantially affect the size of the flow area 300.

Further, the geometry of the outer piston 118 at that restricted flow zone 308 may also reduce the magnitude of the flow forces. Particularly, the outer piston 118 has a cylindrical inner surface 314 (rather than an inclined surface). With this configuration, fluid does not have a large surface area to pull on the outer piston 118 in a closing direction.

Further, referring to FIGS. 2-3 together, the annular chamber 121 formed between the piston cross-holes 119A, 119B and the inlet cross-holes 116A, 116B of the second port 114 may have pressure equal to fluid of the second port 114, e.g., zero psi. On the other side of outer piston 118, the annular chamber 310 may have, as described above, fluid having slightly higher pressure level (e.g., 100 psi). As such, a net fluid force acts on the outer piston 118 in the proximal direction that opposes any flow forces pulling on the outer piston 118 in the distal direction. Such net fluid force may also help unseat the outer piston 118 when the outer piston 118 first begins to move in the proximal direction.

The valve 100 is further configured to operate in a second mode of operation where pressurized fluid is received at the second port 114, whereas the first port 112 is fluidly coupled to a low pressure reservoir (e.g., a reservoir having fluid at a low pressure such as atmospheric or zero psi pressure level). In this mode of operation, the valve 100 operates as a pressure relief valve that relieves fluid from the second port 114 to the first port 112 when pressure level of fluid at the second port 114 exceeds the setting pressure determined by the setting spring 130. In contrast to the first mode of operation, in this second mode of operation, the outer piston 118 and the inner piston 120 do not operate or move as one component (i.e., as a single piston) moving together, but rather separate from each other to form a flow area therebetween to allow fluid flow from the second port 114 to the first port 112.

Figure 4:
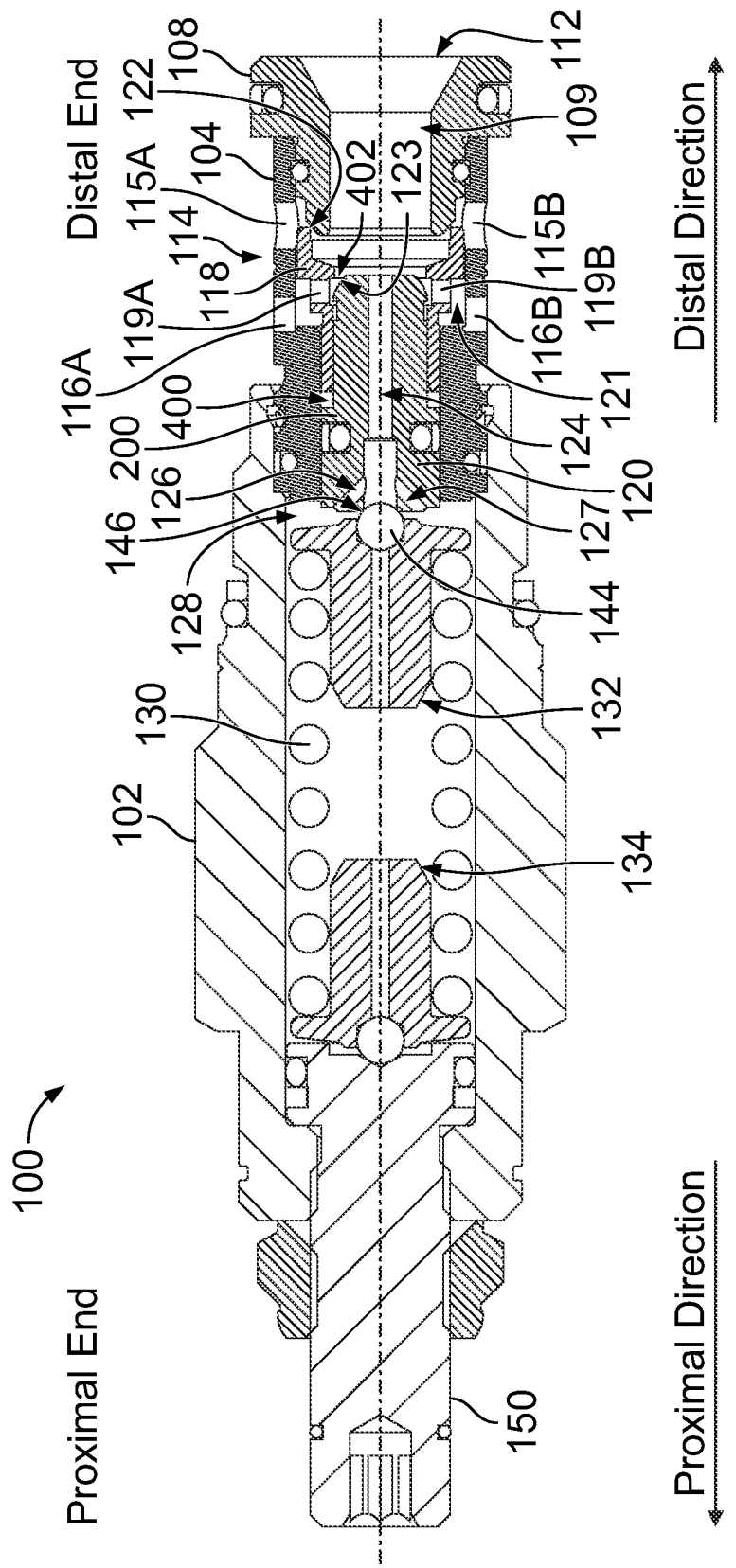
FIG. 4 illustrates a cross-sectional side view of the valve of FIG. 1 operating in a second mode of operation as a relief valve relieving fluid from the second port to the first port, in accordance with an example implementation.

FIG. 4 illustrates a cross-sectional side view of the valve 100 operating in a second mode of operation as a relief valve relieving fluid from the second port 114 to the first port 112, in accordance with an example implementation. Pressurized fluid at the second port 114 is communicated through the inlet cross-holes 116A, 116B to the annular chamber 121. Fluid in the annular chamber 121 then applies a fluid force on the outer piston 118, thereby pushing the outer piston 118 in the distal direction against the seat element 108. As such, the outer piston 118 remains seated at the first seat 122.

Further, pressurized fluid at the second port 114 flows through the inlet cross-holes 116A, 116B, the annular chamber 121, and through unsealed spaces between the outer piston 118 and the inner piston 120 to the interface between the proximal end of the outer piston 118 and the shoulder 200 of the inner piston 120. Fluid at such interface applies a fluid force on the shoulder 200 of the inner piston 120 in the proximal direction. Fluid at the second port 114 also applies a fluid force on the inner piston 120 acting on a circular area of the second seat 123 in the distal direction. Assuming that the inner diameter of the sleeve 104 is $D_2$ as mentioned above, and the diameter of the second seat 123 is $D_3$, then fluid at the second port 114 having a pressure level $P_2$ applies a fluid force F on the inner piston 120 in the proximal direction that can be determined as:

$$P_2(A_2 - A_3) = P_2\left(\pi\frac{D_2^2}{4} - \pi\frac{D_3^2}{4}\right).$$

Fluid at the first port 112 flows through the longitudinal channel 124 and the slanted channels 126, 127 to the spring chamber 128, and fluid in the spring chamber 128 has substantially the same pressure $P_1$ communicated from the first port 112. Thus, fluid in the spring chamber 128 applies a respective fluid force on the inner piston 120 in the distal direction. However, as mentioned above, pressure level of fluid at the first port 112 in this mode of operation is low (e.g., close to zero psi) and thus the fluid force acting on the inner piston 120 in the distal direction may be negligible.

The setting spring 130 applies a spring force on the inner piston 120 via the ball 144. As long as the pressurized level $P_2$ of fluid at the second port 114 is less than the predetermined setting pressure determined by the setting spring 130, the inner piston 120 does not move and remains in contact with the outer piston 118 at the shoulder 200 and the second seat 123.

Once the pressurized level $P_2$ reaches or exceeds the predetermined setting pressure determined by the setting spring 130, fluid pushes the inner piston 120 in the proximal direction (to the left in FIG. 4) away from the outer piston 118. In other words, the inner piston 120 slides along the interior surfaces of the outer piston 118 and the sleeve 104 as depicted in FIG. 4 and an annular space 400 forms. Particularly, the annular space 400 forms as a gap between the outer piston 118, which remains seated at the first seat 122, and the inner piston 120, which has moved in the proximal direction. Thus, the inner piston 120 separates from the outer piston 118, and the longer contact each other at the second seat 123. As a result, a flow area 402 is formed between the outer piston 118 and the inner piston 120.

In this configuration, fluid at the second port 114 is allowed to flow from the second port 114 through the inlet cross-holes 116A, 116B, the annular chamber 121, the piston cross-holes 119A, 119B, the flow area 402, and the main chamber 109 to the first port 112. As such, fluid is relieved from the second port 114 to the first port 112.

Thus, the valve 100 is configured as a bidirectional relief valve capable of relieve pressurized fluid at the first port 112 or the second port 114 when pressure level of fluid exceeds the setting pressure determined by the setting spring 130. The setting pressure can be adjusted by the spring preload adjustment pin 150 as described above.

In an example, the valve 100 can be configured such that the area difference $(A_1-A_2)$ is made equal to the area difference $(A_2-A_3)$. This way, the setting pressure is the same whether fluid is flowing from the first port 112 to the second port 114 or vice versa.

As mentioned above, when the valve 100 is inserted into a cavity of a manifold, a gap may exist between the interior surface of the manifold and the seat element 108. Pressurized fluid at the second port 114 can push the outer piston 118 toward the seat element 108, thereby causing the seat element 108 to traverse such gap, and causing the setting spring 130 to relax (i.e., to be decompressed slightly). Thus, the setting pressure may change slightly (e.g., by 2%) when the valve relieves fluid from the second port 114 to the first port 112. In an example, to compensate for such slight change in the setting pressure, the valve 100 can be configured such that $(A_2-A_3)$ is slightly different from $(A_1-A_2)$, thereby ensuring that the setting pressure remains substantially the same whether fluid is flowing from the first port 112 to the second port 114 or vice versa.

FIG. 5 is a flowchart of a method 500 for operating a valve, in accordance with an example implementation. The method 500 can be used for operating the valve 100, for example.

The method 500 may include one or more operations, functions, or actions as illustrated by one or more of blocks 502-506. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes operating a valve (e.g., the valve 100) in a closed position, wherein the valve comprises (i) a seat element (e.g., the seat element 108), (ii) an outer piston (e.g., the outer piston 118), (iii) an inner piston (e.g., the inner piston 120) disposed partially within the outer piston, and (iv) a setting spring (e.g., the setting spring 130) applying a biasing force on the inner piston in a distal direction, wherein operating the valve in the closed position comprises causing the outer piston to be seated against the seat element to block fluid flow from a first port of the valve to a second port of the valve, and causing the inner piston to be seated against the outer piston to block fluid flow from the second port to the first port.

At block 504, the method 500 includes operating the valve in a first mode of operation, wherein fluid received at the first port applies a net fluid force on the outer piston and the inner piston that overcomes the biasing force, causing the outer piston to be unseated from the seat element and move with the inner piston in a proximal direction, thereby allowing fluid flow from the first port to the second port (see FIGS. 2-3).

At block 506, the method 500 includes operating the valve in a second mode of operation, wherein fluid received at the second port pushes the outer piston in the distal direction against the seat element while applying a respective net fluid force on the inner piston that overcomes the biasing force, causing the inner piston to be unseated from the outer piston and move in the proximal direction, such that a flow area (e.g., the flow area 402) is formed between the outer piston and the inner piston to allow fluid flow from the second port to the first port through the flow area (see FIG. 4).

The method 500 can further include other steps described herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a seat element; an outer piston configured to be seated against the seat element at when the valve is in a closed position to block fluid flow from a first port of the valve to a second port of the valve; an inner piston disposed partially within the outer piston and configured to be seated against the outer piston when the valve is in the closed position to block fluid flow from the second port to the first port; and a setting spring applying a biasing force on the inner piston in a distal direction, wherein the valve operates in: (i) a first mode of operation, wherein fluid received at the first port applies a net fluid force on the outer piston and the inner piston that overcomes the biasing force, causing the outer piston to be unseated from the seat element and move with the inner piston in a proximal direction, thereby allowing fluid flow from the first port to the second port, and (ii) a second mode of operation, wherein fluid received at the second port pushes the outer piston in the distal direction against the seat element while applying a respective net fluid force on the inner piston that overcomes the biasing force, causing the inner piston to be unseated from the outer piston and move in the proximal direction, such that a flow area is formed between the outer piston and the inner piston to allow fluid flow from the second port to the first port through the flow area.

EEE 2 is the valve of EEE 1, further comprising: a sleeve having a longitudinal cylindrical cavity therein, wherein the outer piston and the inner piston are axially-movable within the longitudinal cylindrical cavity of the sleeve.

EEE 3 is the valve of EEE 2, wherein the first port is disposed at a distal end of the seat element and the sleeve, wherein the second port is disposed laterally with respect to the sleeve.

EEE 4 is the valve of EEE 3, wherein the sleeve further comprises: a set of outlet cross-holes formed in the sleeve and through which fluid flows from the first port to the second port when the valve operates in the first mode of operation; and a set of inlet cross-holes formed in the sleeve and through which fluid flows from the second port to the first port when the valve operates in the second mode of operation, wherein the set of inlet cross-holes is axially-spaced from the set of outlet cross-holes along a length of the sleeve.

EEE 5 is the valve of EEE 4, wherein the outer piston comprises a set of piston cross-holes, wherein fluid flows through the set of inlet cross-holes formed in the sleeve, then through the set of piston cross-holes, and then through the flow area to the first port when the valve operates in the second mode of operation.

EEE 6 is the valve of any of EEEs 2-5, wherein the seat element is received at least partially within the sleeve, and wherein the seat element is retained to the sleeve via a retention O-ring.

EEE 7 is the valve of any of EEEs 2-6, further comprising: a housing having a respective longitudinal cylindrical cavity therein, wherein the sleeve is disposed partially within respective longitudinal cylindrical cavity of the housing and retained to the housing via a retention ring.

EEE 8 is the valve of any of EEEs 1-7, wherein, when the valve operates in the first mode of operation, fluid at the first port applies a first fluid force on the outer piston in the proximal direction, wherein the inner piston comprises a plurality of channels configured to communicate fluid from the first port to a spring chamber in which the setting spring is disposed, such that fluid in the spring chamber applies a second fluid force on the inner piston in the distal direction, wherein the net fluid force is a difference between the first fluid force and the second fluid force.

EEE 9 is the valve of any of EEES 1-8, wherein, when the valve operates in the second mode of operation, fluid at the second port applies a first fluid force on the inner piston in the proximal direction and applies a second fluid force on the inner piston in the distal direction, wherein the respective net fluid force is a difference between the first fluid force and the second fluid force.

EEE 10 is the valve of any of EEEs 1-9, wherein the setting spring is retained between a distal spring cap and a proximal spring cap, wherein the setting spring interfaces with, and applies the biasing force to the inner piston, via the distal spring cap.

EEE 11 is the valve of EEE 10, wherein the distal spring cap has a cavity in which a ball is disposed, wherein the ball is seated against the inner piston at a ball seat.

EEE 12 is the valve of any of EEEs 10-11, further comprising: a spring preload adjustment pin interfacing with the proximal spring cap, such that rotating the spring preload adjustment pin causes the spring preload adjustment pin and the proximal spring cap to move axially, thereby adjusting the biasing force of the setting spring.

EEE 13 is the valve of any of EEEs 12, wherein, when the valve operates in the first mode of operation, as the outer piston is unseated from the seat element and moves with the inner piston in the proximal direction, a respective flow area is formed between the outer piston and the seat element, wherein fluid flows from the first port through the respective flow area to the second port.

EEE 14 is a method comprising: operating a valve in a closed position, wherein the valve comprises (i) a seat element, (ii) an outer piston, (iii) an inner piston disposed partially within the outer piston, and (iv) a setting spring applying a biasing force on the inner piston in a distal direction, wherein operating the valve in the closed position comprises causing the outer piston to be seated against the seat element to block fluid flow from a first port of the valve to a second port of the valve, and causing the inner piston to be seated against the outer piston to block fluid flow from the second port to the first port; operating the valve in a first mode of operation, wherein fluid received at the first port applies a net fluid force on the outer piston and the inner piston that overcomes the biasing force, causing the outer piston to be unseated from the seat element and move with the inner piston in a proximal direction, thereby allowing fluid flow from the first port to the second port; and operating the valve in a second mode of operation, wherein fluid received at the second port pushes the outer piston in the distal direction against the seat element while applying a respective net fluid force on the inner piston that overcomes the biasing force, causing the inner piston to be unseated from the outer piston and move in the proximal direction, such that a flow area is formed between the outer piston and the inner piston to allow fluid flow from the second port to the first port through the flow area.

EEE 15 is the method of EEE 14, wherein the valve further comprises a sleeve having (i) a set of outlet cross-holes, wherein operating the valve in the first mode of operation comprises allowing fluid flow from the first port then through the set of outlet cross-holes of the sleeve, and (ii) a set of inlet cross-holes, wherein the set of inlet cross-holes is axially-spaced from the set of outlet cross-holes along a length of the sleeve, and wherein operating the valve in the second mode of operation comprises allowing fluid flow from the second port through the set of inlet cross-holes to the first port.

EEE 16 is the method of EEE 15, wherein the outer piston comprises a set of piston cross-holes, wherein operating the valve in the second mode of operation comprises: allowing fluid flow through the set of inlet cross-holes of the sleeve, then through the set of piston cross-holes, and then through the flow area to the first port.

EEE 17 is the method of any of EEEs 14-16, wherein operating the valve in the first mode of operation comprises: applying, by fluid at the first port, a first fluid force on the outer piston in the proximal direction, wherein the inner piston comprises a plurality of channels configured to communicate fluid from the first port to a spring chamber in which the setting spring is disposed; and applying, by fluid in the spring chamber, a second fluid force on the inner piston in the distal direction, wherein the net fluid force is a difference between the first fluid force and the second fluid force.

EEE 18 is the method of any of EEEs 14-17, wherein operating the valve in the second mode of operation comprises: applying, by fluid at the second port, a first fluid force on the inner piston in the proximal direction; and applying, by fluid from the second port, a second fluid force on the inner piston in the distal direction, wherein the respective net fluid force is a difference between the first fluid force and the second fluid force.

EEE 19 is the method of any of EEEs 14-18, wherein the setting spring is retained between a distal spring cap and a proximal spring cap, wherein the valve further comprises: a spring preload adjustment pin interfacing with the proximal spring cap, and wherein the method further comprises: rotating the spring preload adjustment pin, thereby causing the spring preload adjustment pin and the proximal spring cap to move axially and adjusting the biasing force of the setting spring.

EEE 20 is the method of any of EEEs 14-19, wherein operating the valve in the first mode of operation comprises: as the outer piston is unseated from the seat element and moves with the inner piston in the proximal direction, forming a respective flow area between the outer piston and the seat element, wherein fluid flows from the first port through the respective flow area to the second port.

What is claimed is:

1. A valve comprising:
   a seat element;
   an outer piston configured to be seated against the seat element at when the valve is in a closed position to block fluid flow from a first port of the valve to a second port of the valve;
   an inner piston disposed partially within the outer piston and configured to be seated against the outer piston when the valve is in the closed position to block fluid flow from the second port to the first port; and
   a setting spring applying a biasing force on the inner piston in a distal direction, wherein the valve operates in: (i) a first mode of operation, wherein fluid received at the first port applies a first fluid force on the outer piston in a proximal direction, wherein the inner piston comprises a plurality of channels configured to communicate fluid from the first port to a spring chamber in which the setting spring is disposed, such that fluid in the spring chamber applies a second fluid force on the inner piston in the distal direction, wherein a net fluid force comprising a difference between the first fluid force and the second fluid force is applied on the outer piston and the inner piston and overcomes the biasing force, causing the outer piston to be unseated from the seat element and move with the inner piston in the proximal direction, thereby allowing fluid flow from the first port to the second port, and (ii) a second mode of operation, wherein fluid received at the second port pushes the outer piston in the distal direction against the seat element while applying a respective net fluid force on the inner piston that overcomes the biasing force, causing the inner piston to be unseated from the outer piston and move in the proximal direction, such that a flow area is formed between the outer piston and the inner piston to allow fluid flow from the second port to the first port through the flow area.

2. The valve of claim 1, further comprising:
   a sleeve having a longitudinal cylindrical cavity therein, wherein the outer piston and the inner piston are axially-movable within the longitudinal cylindrical cavity of the sleeve.

3. The valve of claim 2, wherein the first port is disposed at a distal end of the seat element and the sleeve, wherein the second port is disposed laterally with respect to the sleeve.

4. The valve of claim 3, wherein the sleeve further comprises:
   a set of outlet cross-holes formed in the sleeve and through which fluid flows from the first port to the second port when the valve operates in the first mode of operation; and
   a set of inlet cross-holes formed in the sleeve and through which fluid flows from the second port to the first port when the valve operates in the second mode of operation, wherein the set of inlet cross-holes is axially-spaced from the set of outlet cross-holes along a length of the sleeve.

5. The valve of claim 4, wherein the outer piston comprises a set of piston cross-holes, wherein fluid flows through the set of inlet cross-holes formed in the sleeve, then through the set of piston cross-holes, and then through the flow area to the first port when the valve operates in the second mode of operation.

6. The valve of claim 2, wherein the seat element is received at least partially within the sleeve, and wherein the seat element is retained to the sleeve via a retention O-ring.

7. The valve of claim 2, further comprising:
   a housing having a respective longitudinal cylindrical cavity therein, wherein the sleeve is disposed partially within respective longitudinal cylindrical cavity of the housing and retained to the housing via a retention ring.

8. The valve of claim 1, wherein, when the valve operates in the second mode of operation, fluid at the second port applies a first fluid force on the inner piston in the proximal direction and applies a second fluid force on the inner piston in the distal direction, wherein the respective net fluid force is a difference between the first fluid force and the second fluid force.

9. The valve of claim 1, wherein the setting spring is retained between a distal spring cap and a proximal spring cap, wherein the setting spring interfaces with, and applies the biasing force to the inner piston, via the distal spring cap.

10. The valve of claim 9, wherein the distal spring cap has a cavity in which a ball is disposed, wherein the ball is seated against the inner piston at a ball seat.

11. The valve of claim 9, further comprising:
    a spring preload adjustment pin interfacing with the proximal spring cap, such that rotating the spring preload adjustment pin causes the spring preload adjustment pin and the proximal spring cap to move axially, thereby adjusting the biasing force of the setting spring.

12. The valve of claim 1, wherein, when the valve operates in the first mode of operation, as the outer piston is unseated from the seat element and moves with the inner piston in the proximal direction, a respective flow area is formed between the outer piston and the seat element, wherein fluid flows from the first port through the respective flow area to the second port.

13. A method comprising:
    operating a valve in a closed position, wherein the valve comprises (i) a seat element, (ii) an outer piston, (iii) an inner piston disposed partially within the outer piston, and (iv) a setting spring applying a biasing force on the inner piston in a distal direction, wherein operating the valve in the closed position comprises causing the outer piston to be seated against the seat element to block fluid flow from a first port of the valve to a second port of the valve, and causing the inner piston to be seated against the outer piston to block fluid flow from the second port to the first port;

operating the valve in a first mode of operation, wherein fluid received at the first port applies a net fluid force on the outer piston and the inner piston that overcomes the biasing force, causing the outer piston to be unseated from the seat element and move with the inner piston in a proximal direction, thereby allowing fluid flow from the first port to the second port; and operating the valve in a second mode of operation, wherein fluid received at the second port pushes the outer piston in the distal direction against the seat element while applying a respective net fluid force on the inner piston that overcomes the biasing force, causing the inner piston to be unseated from the outer piston and move in the proximal direction, such that a flow area is formed between the outer piston and the inner piston to allow fluid flow from the second port to the first port through the flow area, wherein the valve further comprises a sleeve having (i) a set of outlet cross-holes, wherein operating the valve in the first mode of operation comprises allowing fluid flow from the first port then through the set of outlet cross-holes of the sleeve, and (ii) a set of inlet cross-holes, wherein the set of inlet cross-holes is axially-spaced from the set of outlet cross-holes along a length of the sleeve, and wherein operating the valve in the second mode of operation comprises allowing fluid flow from the second port through the set of inlet cross-holes to the first port.

14. The method of claim 13, wherein the outer piston comprises a set of piston cross-holes, wherein operating the valve in the second mode of operation comprises:

allowing fluid flow through the set of inlet cross-holes of the sleeve, then through the set of piston cross-holes, and then through the flow area to the first port.

15. The method of claim 13, wherein operating the valve in the first mode of operation comprises:

applying, by fluid at the first port, a first fluid force on the outer piston in the proximal direction, wherein the inner piston comprises a plurality of channels configured to communicate fluid from the first port to a spring chamber in which the setting spring is disposed; and applying, by fluid in the spring chamber, a second fluid force on the inner piston in the distal direction, wherein the net fluid force is a difference between the first fluid force and the second fluid force.

16. The method of claim 13, wherein operating the valve in the second mode of operation comprises:

applying, by fluid from the second port, a first fluid force on the inner piston in the proximal direction; and applying, by fluid from the second port, a second fluid force on the inner piston in the distal direction, wherein the respective net fluid force is a difference between the first fluid force and the second fluid force.

17. The method of claim 13, wherein the setting spring is retained between a distal spring cap and a proximal spring cap, wherein the valve further comprises: a spring preload adjustment pin interfacing with the proximal spring cap, and wherein the method further comprises:

rotating the spring preload adjustment pin, thereby causing the spring preload adjustment pin and the proximal spring cap to move axially and adjusting the biasing force of the setting spring.

18. The method of claim 13, wherein operating the valve in the first mode of operation comprises:

as the outer piston is unseated from the seat element and moves with the inner piston in the proximal direction, forming a respective flow area between the outer piston and the seat element, wherein fluid flows from the first port through the respective flow area to the second port.

* * * * *